United States Patent [19]

Schoeny

[11] Patent Number: 4,718,584
[45] Date of Patent: Jan. 12, 1988

[54] AUTOMOTIVE ACCESSORY FOR HATCHBACK AUTOMOBILES AND STATION WAGONS

[76] Inventor: Joseph T. Schoeny, 4224 Marcrest, Cincinnati, Ohio 45211

[21] Appl. No.: 916,785

[22] Filed: Aug. 8, 1986

[51] Int. Cl.[4] ............................................. B60R 5/00
[52] U.S. Cl. ............................... 224/42.42; 217/12 R; 220/6; 296/37.5; 224/311
[58] Field of Search ............................ 224/311, 42.42; 296/37.5; 217/12 R; 220/6

[56] References Cited

U.S. PATENT DOCUMENTS

| | | | |
|---|---|---|---|
| 4,029,244 | 6/1977 | Roberts | 224/42.42 |
| 4,226,348 | 10/1980 | Dottor et al. | 224/42.42 |
| 4,372,512 | 2/1983 | Wolfe | 224/42.42 |
| 4,540,213 | 9/1985 | Herlitz et al. | 224/311 |

Primary Examiner—Houston S. Bell, Jr.
Attorney, Agent, or Firm—Charles R. Wilson

[57] ABSTRACT

An accessory for use in hatchback automobiles and station wagons is dimensioned to fit within the rear interior area of the automobile, and is intended to restrict movement of small articles during transportation. The accessory comprises a base, back flap swingably attached to the base, and at least two side flaps swingably attached to the back flap. When the back flap is positioned in an upright position, and the side flap extended outwardly from the back flap, there is formed open-topped enclosures for retaining the small articles in restricted positions during movement of the automobile.

8 Claims, 7 Drawing Figures

AUTOMOTIVE ACCESSORY FOR HATCHBACK AUTOMOBILES AND STATION WAGONS

This invention relates to an automotive accessory for use in automobiles. More particularly, the invention relates to an automotive accessory for use in the rear area of a hatchback automobile or station wagon for restricting movement of small articles.

BACKGROUND OF THE INVENTION

The problem of transporting small articles, and in particular grocery bags, in automobiles is well known by many consumers. Typically, the grocery bags are positioned on the back seat or on the back floor area of an automobile. Such areas are not intended to hold small articles. Normal driving of the automobile around corners or any sudden stop will likely cause the bags to tip over, thereby spilling their contents. Various solutions have been offered for this widely experienced problem. The solutions have utilized various permanent and semi-permanent racks which fit into the automobile's trunk. Examples of such racks can be found in U.S. Pat. Nos. 4,189,056; 4,226,348; and 4,372,512. All of the disclosed racks are portable knock-down type racks. The racks themselves are not capable of remaining in one spot. Additionally, they are fairly complex to build.

The problem above mentioned is particularly acute with station wagons. Such cars do not have a trunk area which permits the use of a rack. Various other devices have been suggested for use specifically with station wagons. Examples of these articles can be found in U.S. Pat. Nos. 2,986,315; 3,132,781; and 4,540,213. All of the disclosed devices are cumbersome to use in addition to being fairly expensive. Also, such devices when not used take up space and restrict the use of the space for other uses.

Hatchback automobiles are relatively recent in their popularity. They have a front and back seat for passengers and a back area which is very sloped and restricted as to how it can be used. Additionally, the space is open in that there are no deep recesses which can be used to conveniently transport small articles such as grocery bags. The area is also open to view due to windows and therefore, anything carried within the back area should ideally not be unpleasant to the eye. The various racks and other devices designed for use with conventional automobiles and station wagons can also be used with hatchback automobiles. However, the problems associated with them are even more pronounced with hatchback automobiles and therefore, have not been widely used.

In accord with this invention, an automotive accessory has been devised which is especially useful with hatchback automobiles and station wagons. The accessory is relatively inexpensive to produce yet, is easy to install and satisfactorily performs its function. The accessory is such that it can be folded down so as to present a flat surface when not in use.

SUMMARY OF THE INVENTION

A collapsible automotive accessory for installation in a rear area of a hatchback automobile or station wagon is capable of forming compartmentalized enclosures for retaining small articles placed therein in restricted positions. The automotive accessory comprises a substantially flat base dimensioned to fit into the back area of the automobile. A back flap is swingably attached in a lateral direction to the flat base so as to allow vertical movement from the base to a substaintially upright position. Latch means are provided for retaining the upright position of the back flap. Two side flaps are attached to the back flap so as to move outwardly from the back flap. Latch means are also provided for retaining said positions. Once fully assembled, there are created a large inner open topped enclosure and at least one smaller open topped enclosure into which can be placed articles of various sizes for retention and restricted movement.

DETAILED DESCRIPTION OF THE INVENTION

While the description which follows describes the invention in terms of its use with hatchback automobiles, the invention has applicability for use with station wagons as well. However, the automotive accessory of the present invention is particularly intended for use in hatchback automobiles. Such automobiles are in very common use. Typically, they have front and back seats and a rear open interior area. The rear area is defined by the backs of the seats, the verticle sidewalls of the automobile body and the top lid area. Typically, the surface of the rear interior area is flat and is covered with a carpet like material. Small articles can fit into the area for transport. The description of the automotive accessory which follows is for use in such automobiles.

Figure 1:
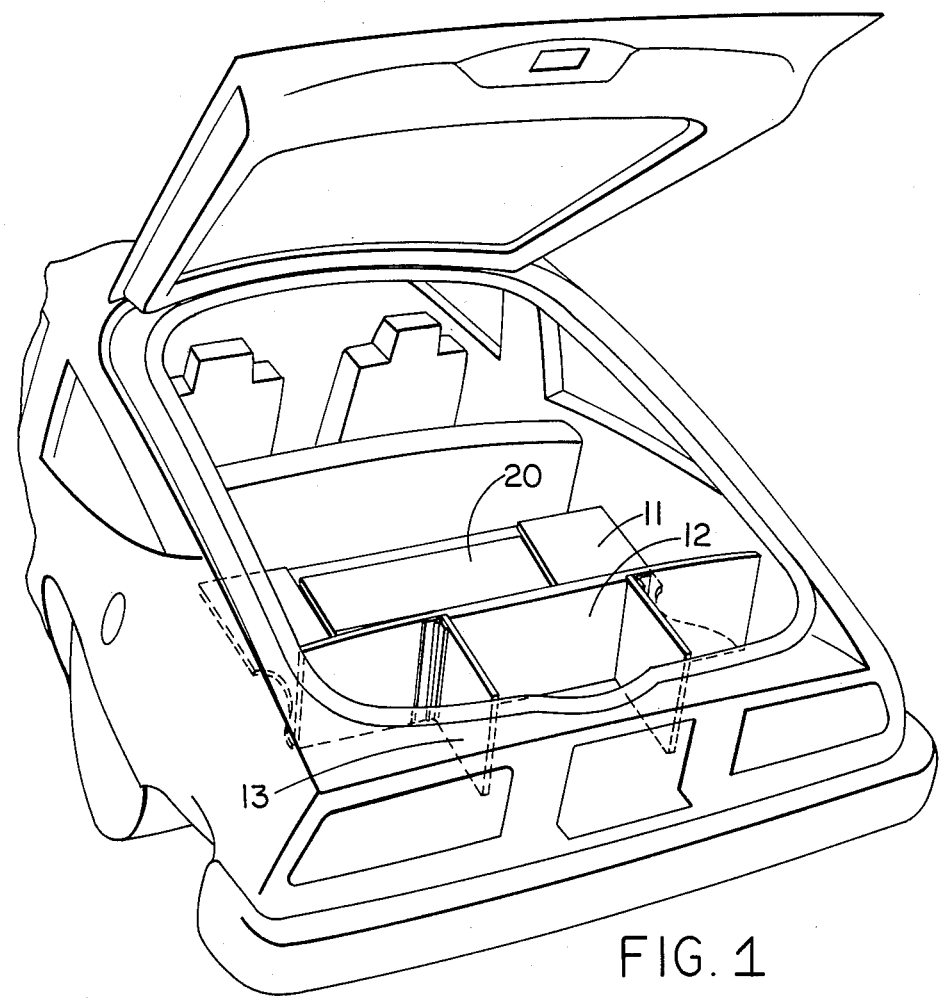
FIG. 1 is a perspective view of the automotive accessory on this invention when placed in the rear area of a hatchback automobile.
Figure 2:
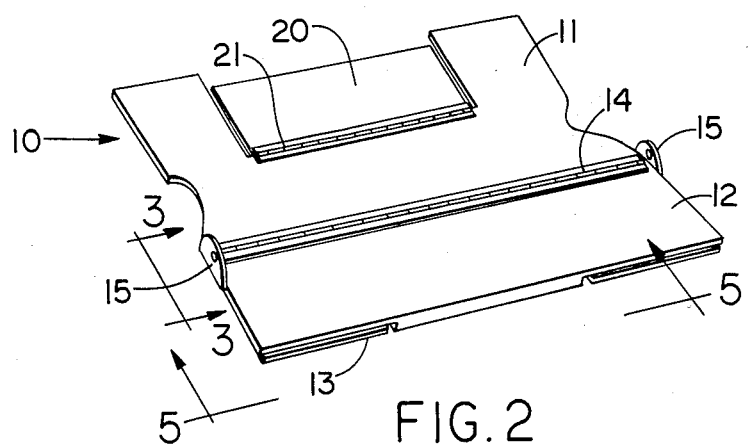
FIG. 2 is a view in perspective of the automotive accessory in a flat break-down configuration.

The automotive accessory in this invention is illustrated in FIG. 1 generally as 10. With reference to FIGS. 1 and 2, the automotive accesscry comprises a substantially flat base 11 and a back flap 12. The back flap itself has two side flaps 13 attached thereto. Base 11 and back flap 12 are each dimensioned to fit within the automobile's back area. Preferably, they are dimensioned so that when laid flat in the rear of a hatchback automobile there will be minimal sidewall clearance between them and the inner vertical sidewalls. The minimal sidewall clearance is to ensure there will not be substantial lateral and/or longitudinal movement of the accessory when the automobile itself moves. The exact dimensions of base 11 and back flap 12 will depend on the interior contour of each automobile. The break where hinge 14 is placed is not critical, though generally from about ten inches to about twenty inches is the depth of back flap 12 from its end to the break. As more evident from the following paragraphs, this depth distance allows an enclosure size best suited for holding grocery bags, and other similar sized articles.

Figure 3:
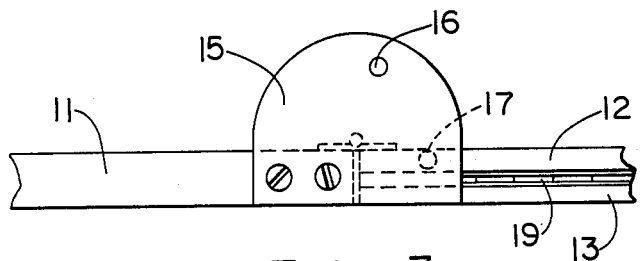
FIG. 3 is a partial side view of the latch mechanism and accessory shown in FIG. 2.
Figure 4:
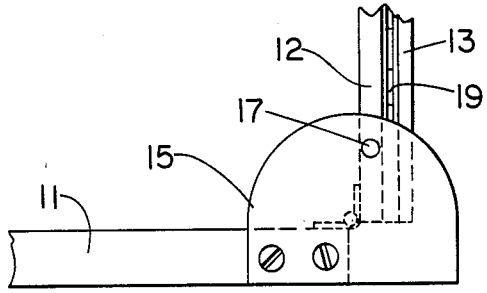
FIG. 4 is a partial side view of the latch mechanism and accessory of FIG. 3 when in operation.

A hinge 14 is used to swingably attach base 11 and back flap 12 together so that the back flap can move from a normal flat rest position to an upright position, forming a substantially ninety degree angle with the base. A single hinge 14 can be used as shown or a series of smaller hinges can be used to connect the two pieces together. Hinge 14 can be recessed or as shown. Latch means are also provided for holding the back flap in an upright position. Any of various devices can be used as latch means, e.g. cam locks, pin locks, over-center locks and internal spring-loaded button means. As shown in FIGS. 3 and 4, the latch means comprises a bracket and spring-loaded button. A bracket 15 is mounted on at least one edge of flat base 11 near the hinge 14 with any suitable attachment means. A hole 16 is provided in bracket 15 to receive button pin 17 mounted on one edge of back flap 12. The bracket 15 extends sufficiently past where the break occurs so that hole 16 is in position to receive button pin 17. Button pin 17 is spring-loaded so that it can be forced back into the interior of back flap 12. Lifting of the back flap to a substantially upright position allows button pin 17 to become aligned with hole 16; force from the spring causes the button pin 17 outward and into hole 16. The back flap is thus locked in an upright position.

Figure 5:
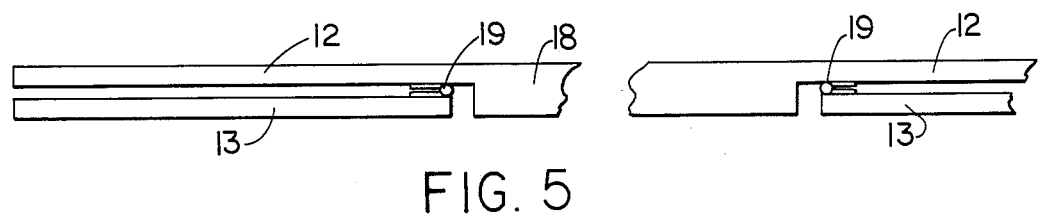
FIG. 5 is an end view of the automotive accessory of FIG. 2.

Back flap 12 has attached to it at least two side flaps 13. The side flaps 13 are swingably attached so as to lie in the same plane when the accessory lies flat in its rest position, but to swing out in a substantially ninety degree arc when the back flap is in an upright position. As evident from FIG. 5, side flaps 13 fit into recesses in the underside of the back flap dimensioned to accommodate said side flaps. In order that base 11 and back flap 12 together form a planar unit when in the rest position, back flap 12 must have the same thickness in its unrecessed portion 18 as in the base 11. Over-center hinges 19 are provided to allow each side flap to swing into a fully extended position as shown in FIG. 1. Other attachement means could be used in place of hinges 19, e.g. spring-loaded means wherein a rod and recess are provided. Latch means are provided where needed for maintaining the flaps in their described position. Several side flaps can be positioned along the back flap for swinging outwardly in operation depending on design parameters. Preferably, two side flaps, each hinged on the back flap at a point so as to provide three substantially equal enclosures when folded-out are used.

An optional flap 20 is provided at the front of base 11. Many hatchback automobiles contain a storage compartment in the floor of the rear area. Flap 20 permits access to this compartment. As shown in FIG. 2, flap 20 is attached with hinge 21 to base 11. Access to the compartment is gained merely by lifting flap 20.

Figure 6:
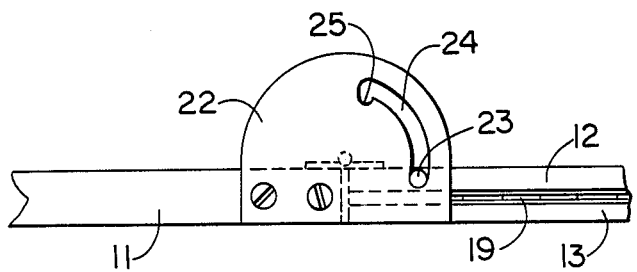
FIG. 6 is a partial side view of another latch mechanism which is useable on the accessory of FIG. 2.
Figure 7:
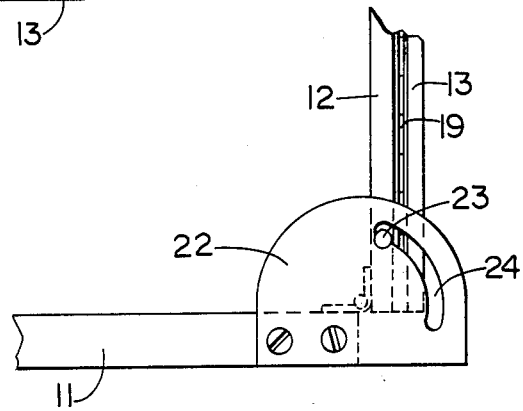
FIG. 7 is a partial side view of the latch mechanism of FIG. 6 when in operation.

Another suitable latch means depicted in FIGS. 6 and 7 is a camlock comprised of a bracket 22 mounted on at least one edge of the flat base and a knob 23 mounted on at least one edge of the back flap. The bracket has a slot 24 in which the knob rides. The rest position is shown in FIG. 6 When the back flap is raised, knob 23 rides up along the slot until it reaches detent 25. Sufficient play is built into hinge 14 to allow knob 23 to drop down into detent 25. The knob 23 rests in detent 25 and in effect locks the back flap in a stable position.

Attachment means such as Velcro can also optionally be placed on the bottom surface of the accesssory for interaction with the carpet in the rear area. While not necessary, the Velcro does provide an added measure of assurance against unwanted lateral or longitudinal movement of the accessory.

In operation, the accessory 10 is laid flat in the rear area of a hatchback automobile. The contour of base 11, back flap 12 and storage compartment flap 20 are such that the accessory fits snugly into the rear area with minimal clearance between it and the automobile's interior vertical side walls. The accessory is normally maintained in its flatten rest position. When the need arises to transport some small article(s), the back flap 12 is intially raised to its upright position, and latch means activated to maintain that position. Next, at least one of the side flaps 13 is moved from its rest position outwardly until it forms a ninety degree angle with the back flap. The side flap is then maintained in that position by the use of latch means. The resultant accessory forms at least three open-topped enclosures with the surrounding automobile interior walls. Small articles, e.g. grocery bags, are placed in the enclosures thereby restricting their movement when the automobile is operated. The side flaps and back flap are returned to their rest positions when articles are not being transported and a flattened area is desired for appearance purposes or to transport larger articles.

While the accessory of this invention has been described with respect to the figures, it should be understood other embodiments are within the scope of coverage of the following claims.

What is claimed is:

1. A collapsible automotive accessory for installation in a rear area of a hatchback automobile or station wagon, said accessory adapted for forming compartmentalized enclosures for retaining small articles placed therein in restricted positions, comprising:
   (a) a substantially flat base;
   (b) a back flap swingably attached in a lateral direction to the base so as to permit vertical movement from the base to a substantially upright position and means for retaining said upright position so that the vertical walls of the area and the back flap create an inner open topped enclosure; and
   (c) at least two side flaps swingably attached to the back flap so as to move outwardly from the raised back flap and means for retaining said position so that the vertical walls of the rear area, the back flap, and the side flaps create at least three open-topped enclosures, further wherein said flat base and back flap are dimensioned so that when laid flat in the rear area there is (1) minimal sidewall clearance with the inner vertical walls of the area so as to prevent substantial lateral and longitudinal movement of the accessory and (2) they form a substantially planar unit.

2. The accessory of claim 1 wherein the back flap has recessed portions in its underside to accommodate the side flaps so that when said flaps are folded inwardly in a rest position, they are flush with the back flap.

3. The accessory of claim 1 wherein the back flap is hinged to the flat base.

4. The accessory of claim 3 wherein the means for retaining the back flap in a substantially upright position comprises (i) a bracket mounted on one edge of the flat base, said bracket having a hole for receiving a button pin and (ii) a spring-loaded button pin mounted in an edge of the back flap so as to engage the receiving hole of the bracket when the back flap is moved into the substantially upright position.

5. The accessory of claim 1 further comprising an additional flap swingably attached in a lateral direction to the flat base for raising so as to allow access to a storage compartment underneath said accessory.

6. The accessory of claim 1 wherein semi-permanent attachment means are positioned on the bottom surface of the flat base for holding said base to the automobile's rear area.

7. The accessory of claim 6 wherein the semi-permanent attachment means are strips of Velcro.

8. The accessary of claim 2 wherein the back flap has two recessed portions in its underside and has two side flaps hinged at points on the back flap so as to provide three substantially equal enclosures when folded out.

* * * * *